(12) United States Patent
Kawasaki et al.

(10) Patent No.: US 8,259,930 B2
(45) Date of Patent: Sep. 4, 2012

(54) WATERPROOF STRUCTURE AND ELECTRONIC EQUIPMENT

(75) Inventors: Yasuhiko Kawasaki, Higashiyamato (JP); Yutaka Koyama, Tachikawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 107 days.

(21) Appl. No.: 12/256,893

(22) Filed: Oct. 23, 2008

(65) Prior Publication Data

US 2009/0101384 A1    Apr. 23, 2009

(30) Foreign Application Priority Data

Oct. 23, 2007    (JP) ................. 2007-274915

(51) Int. Cl.
*H04M 1/00* (2006.01)
*H04M 9/00* (2006.01)

(52) U.S. Cl. .................. 379/433.04; 455/566

(58) Field of Classification Search ............ 379/433.04, 379/433.01; 455/566; 345/173, 177; 381/388
See application file for complete search history.

(56) References Cited

U.S. PATENT DOCUMENTS

| | | | |
|---|---|---|---|
| 6,370,362 B1 * | 4/2002 | Hansen et al. | 455/90.1 |
| 6,594,472 B1 * | 7/2003 | Curtis et al. | 455/575.8 |
| 7,409,058 B2 * | 8/2008 | Holmes et al. | 379/433.02 |
| 7,463,734 B2 * | 12/2008 | Tolbert et al. | 379/433.04 |
| 7,609,148 B2 * | 10/2009 | Takashima et al. | 340/388.1 |
| 2002/0005838 A1 * | 1/2002 | Inoue et al. | 345/173 |
| 2006/0258325 A1 | 11/2006 | Tsutaichi et al. | |
| 2007/0034493 A1 | 2/2007 | Kawasaki et al. | |
| 2007/0227873 A1 | 10/2007 | Kawasaki et al. | |
| 2007/0236465 A1 | 10/2007 | Chou et al. | |

FOREIGN PATENT DOCUMENTS

| | | |
|---|---|---|
| JP | 3-60300 | 3/1991 |
| JP | 10-115688 | 5/1998 |
| JP | 2002-198664 | 7/2002 |
| JP | 2005-236573 | 9/2005 |
| JP | 2006-166029 | 6/2006 |
| JP | 2006-186691 | 7/2006 |
| JP | 2006-261210 | 9/2006 |
| WO | WO 2007/086579 | 8/2007 |

* cited by examiner

*Primary Examiner* — Davetta W Goins
*Assistant Examiner* — Phylesha Dabney
(74) *Attorney, Agent, or Firm* — Cozen O'Connor

(57) ABSTRACT

With a waterproof structure for the space between a first case and a diaphragm doubling as a display panel provided facing the first case, a first resilient member is integrally formed at a surface of the diaphragm facing the first case, and the first resilient member is press-fitted into a groove formed in a surface of the first case facing the diaphragm side.

11 Claims, 15 Drawing Sheets

WATERPROOF STRUCTURE AND ELECTRONIC EQUIPMENT

BACKGROUND OF THE INVENTION

1. Field of the Invention

The present invention relates to a waterproof structure provided across a first case and a diaphragm doubling as a display panel provided facing the first case, and electronic equipment equipped with the waterproof structure.

2. Description of the Related Art

Typically, a panel speaker emits sound as a result of a panel and/or casing being made to vibrate by a drive source such as an actuator. Such a panel speaker does not require a sound hole and is therefore suited to being waterproof. However, it is not possible to fix the panel and casing firmly together because the panel and casing are made to vibrate. It is therefore difficult to adopt a sealed structure for the casing.

In a structure for installing a flat panel speaker as disclosed in, for example, Unexamined Japanese Patent Application KOKAI Publication No. 2006-166029, an actuator module is fitted to a prescribed position on a diaphragm and the diaphragm is then fitted to a front case via a frame-shaped gasket member composed of silicon rubber. The gasket member is then fitted to the diaphragm and a mounting surface of the front case via a frame-shaped double-sided adhesive sheet. This prevents infiltration of moisture etc. without hindering vibration of the diaphragm.

However, with the document disclosed above, the diaphragm, the gasket member, and the front case are adhered using double-sided adhesive sheet. The thickness of the panel speaker is therefore increased and the number of components becomes substantial. Further, it is necessary for the gasket member to hold the diaphragm while expanding and contracting. The meaning of holding the diaphragm also implies that adhesion between the gasket member and the double-sided tape is also necessary. It is therefore difficult for all of the conditions to be realistically satisfied. When considering comprehensive waterproofing for the structure of the disclosed document, it is also necessary to consider a waterproof structure for between the front case and the rear cover.

SUMMARY OF THE INVENTION

In order to resolve the above situation, it is therefore an object of the present invention to provide a waterproof structure and electronic equipment capable of reducing the number of components, making the structure simple and thin, and capable of bringing about high resistance to water.

In order to resolve the above problems, according to one aspect of the present invention, in a waterproof structure for the space between a first case and a diaphragm doubling as a display panel provided facing the first case, a first resilient member is integrally formed at a surface of the diaphragm facing the first case, and the first resilient member is press-fitted into a groove formed at a surface of the first case facing the diaphragm side.

According to another aspect of the present invention, in a waterproof structure for the space between a first case and a diaphragm doubling as a display panel provided facing the first case, the first resilient member is formed integrally via a film at a surface of the diaphragm facing the first case, and the first resilient member is press-fitted into a groove formed at a surface of the first case facing the diaphragm.

According to the present invention, it is possible to implement a highly waterproof panel speaker while reducing the number of components, simplifying the structure, and making the structure thin.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

The following is a description using the drawings of exemplary embodiments of the present invention. Various preferred technological limitations are imposed in order to exemplify the present invention in the embodiments described below but the scope of the present invention is not limited to the embodiments and exemplary examples explained below. A description is given in the following of the case of applying the waterproof structure of the present invention to a folding-type mobile telephone (electronic equipment).

First Embodiment

Figure 1:
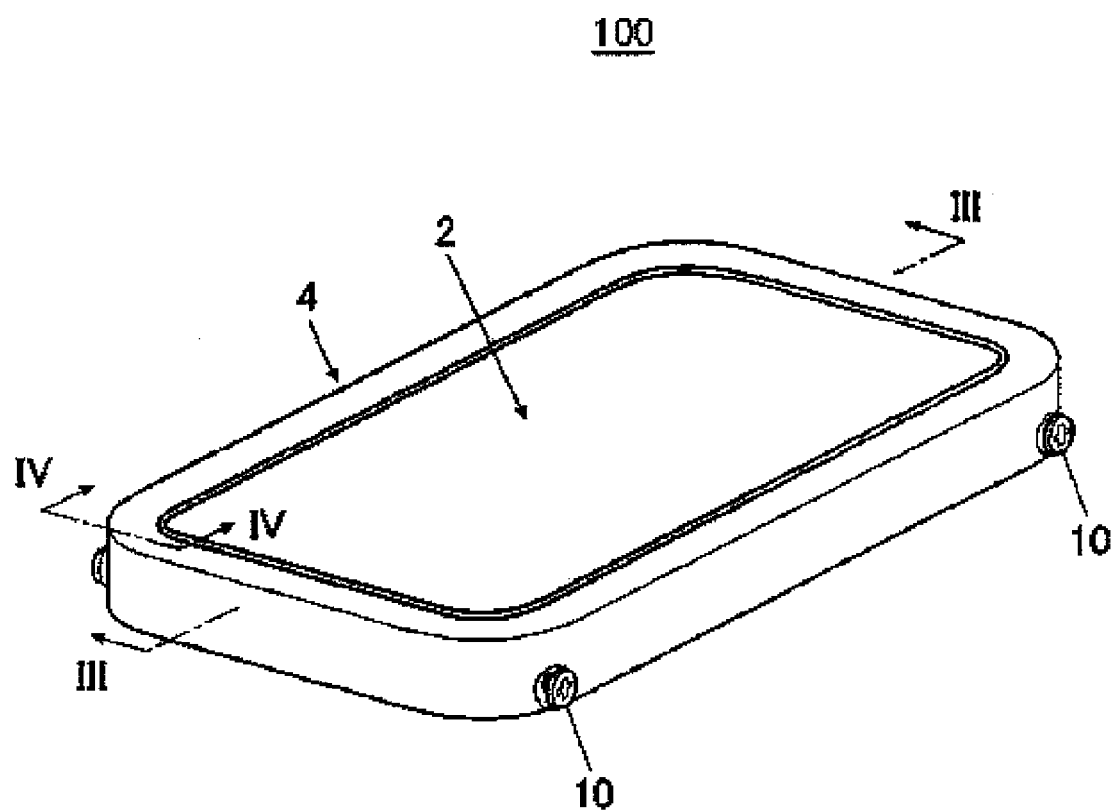
FIG. 1 is a perspective view of a display-side casing according to a first embodiment of the present invention.
Figure 2:
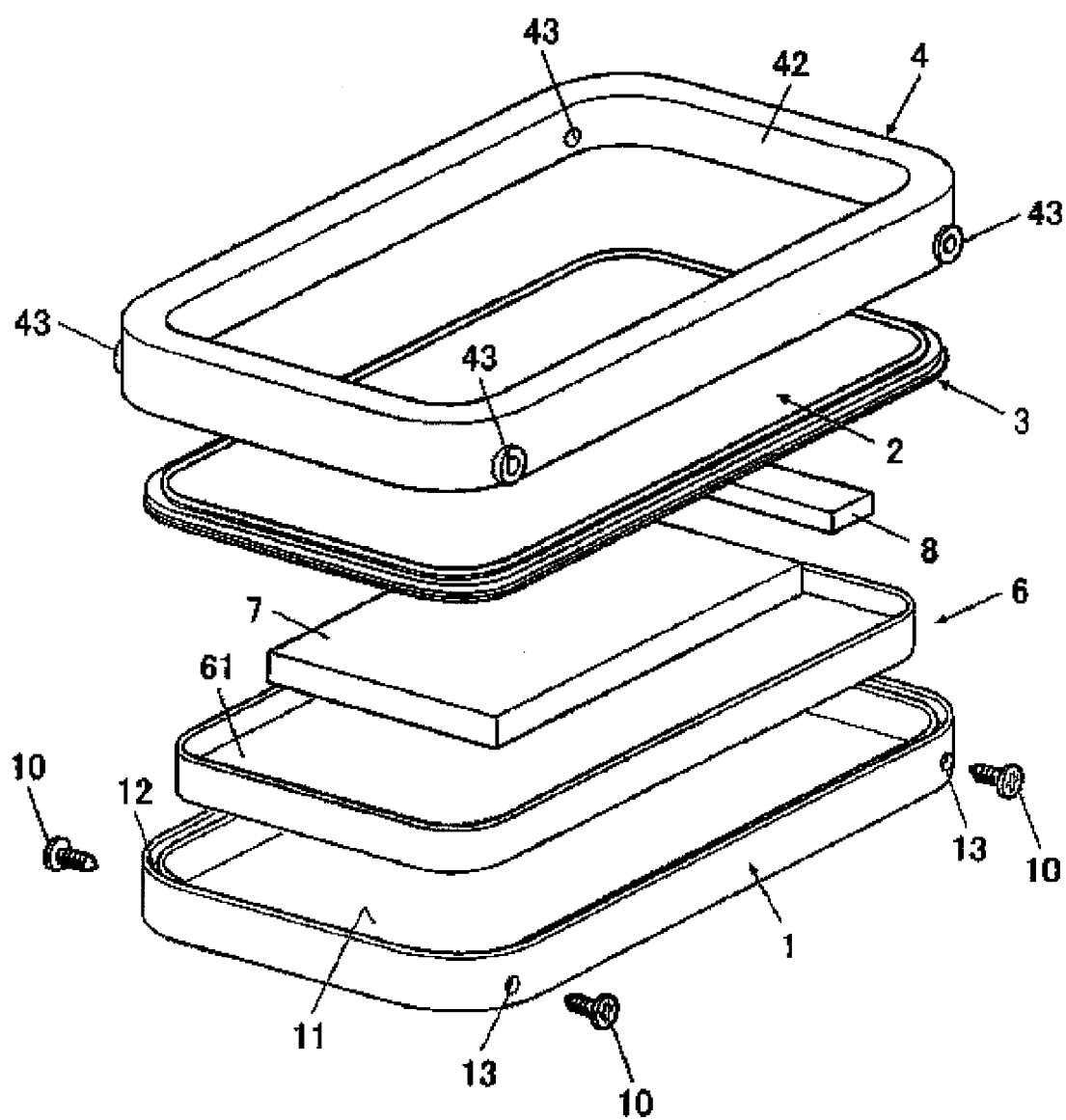
FIG. 2 is an exploded perspective view of the display-side casing according to the first embodiment of the present invention.
Figure 3:
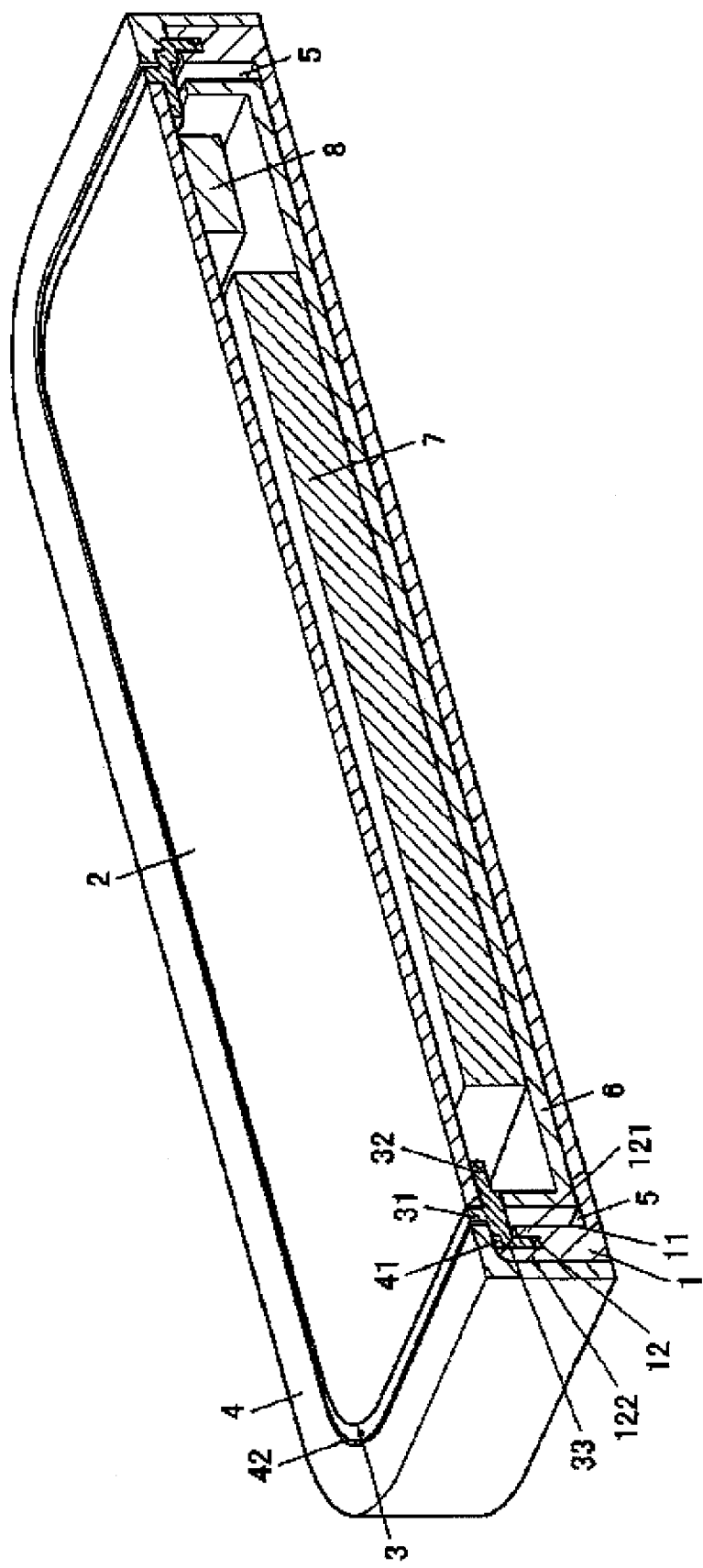
FIG. 3 is a cross-sectional view in the direction of an arrow of a cross-section cut along cutting plane line III-III of FIG. 1.
Figure 4:
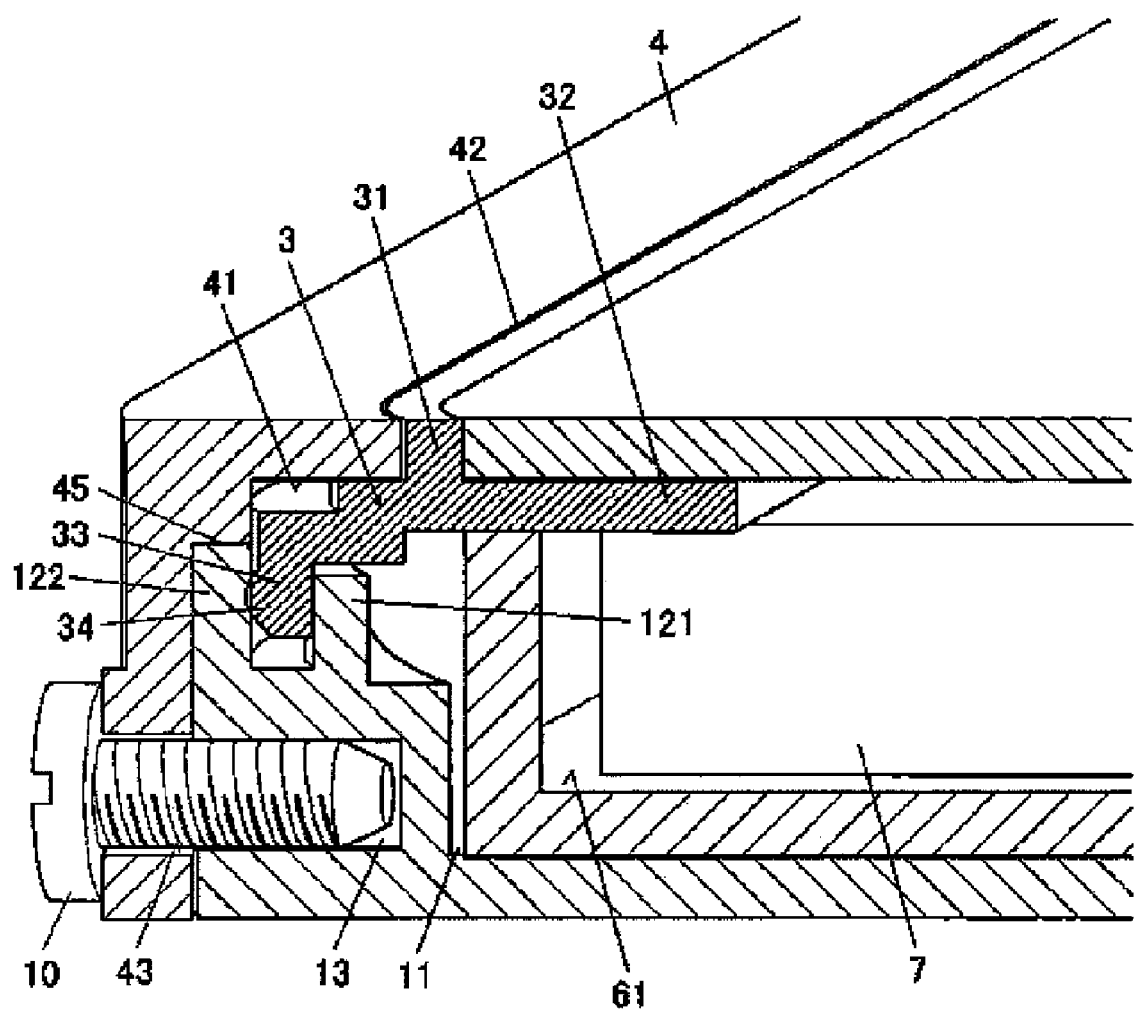
FIG. 4 is a cross-sectional view in the direction of an arrow of a cross-section cut along cutting plane line IV-IV of FIG. 1.

FIG. 1 is a perspective view of a display-side casing 100, FIG. 2 is an exploded perspective view of the display-side casing 100, FIG. 3 is an cross-sectional view in the direction of an arrow cut along cutting plane line III-III of FIG. 1, and FIG. 4 is a cross-sectional view in the direction of an arrow cut along cutting plane line IV-IV of FIG. 1.

In the following description, "vertical direction" is explained taking FIG. 3 as a reference.

A folding-type mobile telephone includes the display-side casing 100 and an operation unit casing. The display-side casing 100 has a display unit 7 including a liquid crystal display etc. A set of operation keys are provided at the operation unit casing. The display-side casing 100 and the operation unit casing are coupled by a hinge structure so as to be capable of rotation.

The display-side casing 100 includes a first case 1, a diaphragm 2, and a first resilient member 3. The first case 1 faces to the outside while the folding-type mobile telephone is closed. The diaphragm 2 is provided facing the first case 1 and faces towards the inside while the folding-type mobile telephone is closed. The first resilient member 3 is formed integrally with a lower surface of the diaphragm 2 at a lower surface facing towards the side of the first case 1. The display-side casing 100 has an opening 42, with the diaphragm 2 being disposed within the opening 42. The display-side casing 100 includes a second case 4 and a center case 6. The second case 4 covers the first case 1 from above. The center case 6 is housed within a space 5 formed between the first case 1 and the diaphragm 2.

The first case 1 has a recess 11 hollowed out in a downward direction. The space 5 is formed by the recess 11 and the diaphragm 2. The center case 6, the display unit 7, and the drive device 8 etc. are then housed in the space 5. A groove 12 is then formed in the shape of a rectangular frame at the upper end surface of the first case 1. The first resilient member 3 is then press-fitted into the groove 12. An upper end of an inner wall section 121 forming the groove 12 is slightly lower than the upper end of an outer wall section 122. The first resilient member 3 is then disposed extending along the upper end of the inner wall section 121 and an upper end of the center case 6.

The diaphragm 2 also serves as a display panel. The diaphragm 2 is substantially rectangular in shape and a drive device 8 such as an actuator for the panel speaker is fixed to a lower surface of the diaphragm 2. The drive device 8 is only fixed to the diaphragm 2 but is not attached to the center case 6 and is therefore free with respect to the side of the center case 6. Fixing of the drive device 8 to the diaphragm 2 in this manner is so that the drive device 8 causes the diaphragm 2 to exhibit a bending action rather than a reciprocating operation. This causes sound to be generated as a result of this resonating action. The body of the drive device 8 itself can freely change and it is necessary to transmit this vibration to the diaphragm 2. A flexible cable is therefore used for electrical connection.

The first resilient member 3 is formed integrally so as to span from a lower surface edge of the diaphragm 2 to the outer peripheral edge.

The first resilient member 3 is formed from, for example, rubber packing, in the shape of a substantially rectangular frame along an outer peripheral edge of the diaphragm 2. The first resilient member 3 includes a sandwiched section 31, an extending section 32, and a protruding section 33. The sandwiched section 31 is sandwiched between the second case 4 and the diaphragm 2. The extending section 32 extends to a lower surface side of the diaphragm 2 from the sandwiched section 31 and is disposed so as to extend across an upper end of the center case 6 and the inner wall section 121 forming the groove 12. The protruding section 33 is provided at an end section at an outer side of the extending section 32 and is press-fitted into the groove 12 of the first case 1. A projection 34 press-fitting with the wall surface (outer wall section 122) forming the groove 12 is formed at the protruding section 33. It is therefore possible to prevent the first resilient member 3 from coming away from the groove 12. As shown in FIG. 4, the projection 34 is formed with a gradual incline so as to become tapered toward the tip of the protruding section 33 and appears as being substantially wedge-shaped in cross-section.

The first resilient member 3 is then formed integrally with the diaphragm 2. For example, thermal fusion using insert molding and coinjection molding using a material with self-adhering properties can be given as integrally forming methods. However, there are no particular restrictions as long as resistance to peeling is provided and gaps are not present.

The second case 4 has a recess 41 hollowed out in an upward direction. The opening 42 is formed in the recess 41. The diaphragm 2 and the sandwiched section 31 of the first resilient member 3 are then fitted at the opening 42. The sandwiched section 31 is sandwiched by the inner wall surface forming the opening 42 of the second case 4 and an outer peripheral edge of the diaphragm 2.

An engaging section 45 is formed at the recess 41 of the second case 4 and engages with the outer wall section 122 forming the groove 12.

The center case 6 is housed within the recess 41 of the second case 4 (within the space 5 formed by the first case 1 and the diaphragm 2). The center case 6 has a recess 61 hollowed out downwards as with the first case 1. The display unit 7 including a display section such as a liquid crystal display, a drive circuit for driving the display section, and a power supply etc., and a drive device 8 fixed to a lower surface of the diaphragm 2 are housed within the recess 61 of the center case 6.

As shown in FIG. 1 and FIG. 2, screw holes 43, 43, . . . passing through the outer side surface of the second case 4 are formed at the four corners of the outer-side surface. Screw-holes 13, 13, . . . that the screws 10 are screwed into are also formed at the outer-side surface of the first case 1 corresponding to the screw holes 43, 43, . . . . The first case 1 and the second case 4 are then fixed together by screwing the screws 10, 10, . . . into the screw holes 43, 43, . . . and 13, 13, . . . .

The display-side casing 100 constructed in this manner is such that the diaphragm 2 vibrates so as to function as a speaker as a result of being driven by the drive device 8.

Next, a description is given of a method of assembling the display-side casing 100.

First, the first resilient member 3 is formed in an integral manner along the lower surface edge and the outer peripheral edge of the diaphragm 2 using well-known insert molding etc. Next, the drive device 8 is fixed to the lower surface of the diaphragm 2 using double-sided tape.

On the other hand, the center case 6 and the display unit 7 are housed within the recess 11 of the first case 1. The protruding section 33 of the first resilient member 3 is then press-fitted into the groove 12 of the first case 1 and the top of the center case 6 is covered by the diaphragm 2. The second case 4 is also fitted to the first case 1 as a result of the engaging section 45 of the second case 4 fitting with the outer wall section 122 of the first case 1. The diaphragm 2 and the first resilient member 3 are disposed within the opening 42 of the second case 4, with the first case 1 being covered by the second case 4. Finally, the first case 1 and the second case 2 are fixed together by screwing the screws 10, 10, . . . into the screw holes 13, 13, . . . of the first case 1 from the screw holes 43, 43, . . . formed in the second case 4.

The first resilient member 3 is formed integrally at the lower surface of the diaphragm 2 towards the side of the first case 1 and is press-fitted into the groove 12 formed at the upper surface towards the side of the diaphragm 2 of the first case 1. It is therefore possible to make the space between the diaphragm 2 and the first case 1 waterproof using the first resilient member 3 press-fitted into the groove 12. It is also possible to achieve waterproofing without this being dependent on compression of the first case 1 and the second case 4. The number of components can be reduced, the structure can be simplified, and a degree of thinness can be achieved by integrating the diaphragm 2 and the first resilient member 3.

The display-side casing 100 includes the second case 4 that covers the first case 1 having the opening 42, and the center case 6 contained in the space 5 formed between the first case 1 and the diaphragm 2. Further, the first resilient member 3 is fixed by the second case 4 and is disposed between the diaphragm 2 and the center case 6. It is therefore possible for the display-side casing 100 to provide protection from abnormal loads from the surface of the diaphragm 2 and to ensure mobility as a result of the diaphragm 2 not being constrained, using the first resilient member 3 and the center case 6.

Second Embodiment

Figure 5:
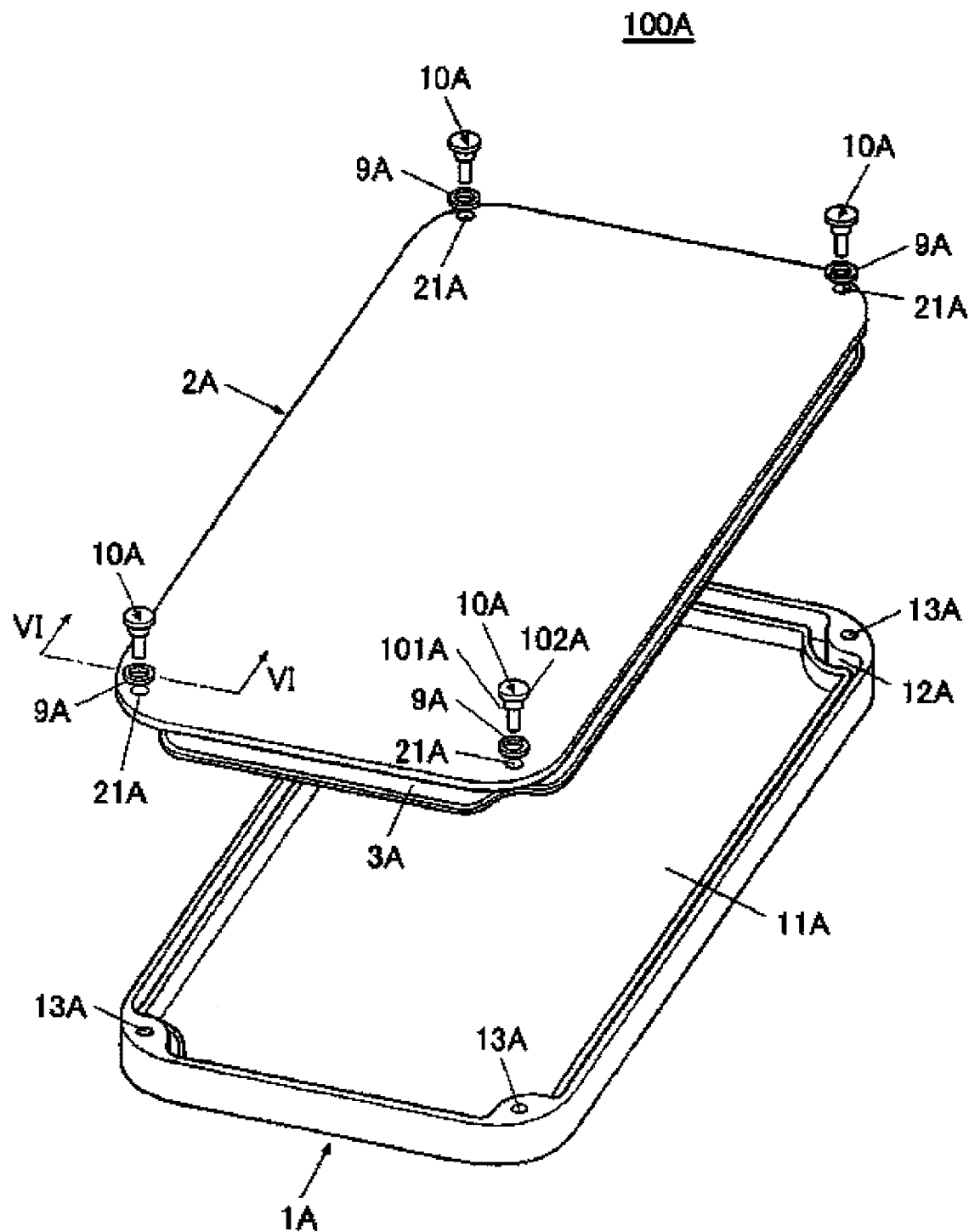
FIG. 5 is an exploded perspective view of the display-side casing according to a second embodiment of the present invention.
Figure 6:
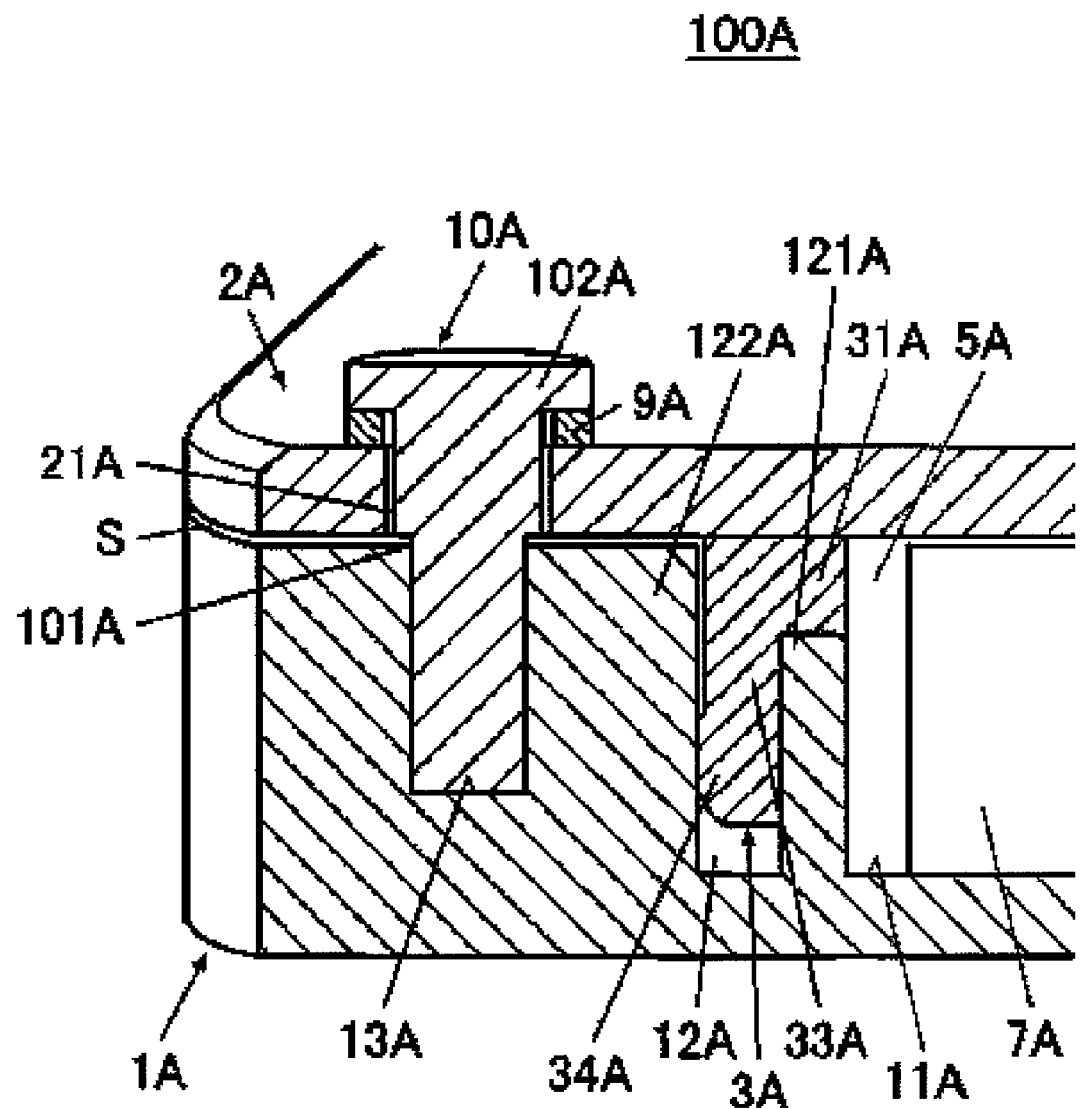
FIG. 6 is a cross-sectional view in the direction of an arrow of a cross-section cut along cutting plane line VI-VI with the display-side casing of FIG. 5 assembled.

FIG. 5 is an exploded perspective view of the display-side casing 100A, and FIG. 6 is a cross-sectional view taken cut along a cutting plane line VI-VI with the display-side casing 100A in FIG. 5 assembled.

In the following description, "vertical direction" is explained taking FIG. 6 as a reference.

The second embodiment differs from the first embodiment in that the display-side casing 100A does not have a second case but rather a diaphragm 2A and a first case 1A are fixed directly.

Specifically, the display-side casing 100A includes the first case 1A, the diaphragm 2A, and a first resilient member 3A. The diaphragm 2A is provided facing the first case 1A and doubles as a display panel. The first resilient member 3A is formed integrally with a lower surface of the diaphragm 2A at a lower surface facing towards the side of the first case 1A.

The first case 1A has a recess 11A hollowed-out downwards as with the first case 1 of the first embodiment. The space 5A is formed by the recess 11A and the diaphragm 2A. The display unit 7A and a drive device are housed in the space 5A. A groove 12A is formed in the shape of a rectangular frame at an upper end surface of the first case 1A. The first resilient member 3A is then press-fitted into the groove 12A. An upper end of an inner wall section 121A forming the groove 12A is slightly lower than the upper end of an outer wall section 122A. The first resilient member 3A is then disposed at the upper end of the inner wall section 121A.

The diaphragm 2A is in the shape of a substantially rectangular plate of substantially the same size as the upper surface of the first case 1A, with a drive device being fixed to a lower surface. The drive device is fixed in the same way as the drive device 8 of the first embodiment.

The substantially rectangular frame-shaped first resilient member 3A is integrally formed at the lower surface edge of the diaphragm 2A.

The first resilient member 3A is, for example, made of rubber packing, is formed in a rectangular frame shape, and does not extend at the outer peripheral edge side of the diaphragm 2A. The first resilient member 3A forms an L-shape when viewed in cross-section and includes a mounting section 31A and a protruding section 33A. The mounting section 31A is disposed at an upper end of the inner wall section 121A forming the groove 12A. The protruding section 33A fits into the groove 12A of the first case 1A. A projection 34A substantially wedge-shaped when viewed in cross-section that presses a wall surface (outer wall section 122A) forming the groove 12A is formed at the protruding section 33A. It is therefore possible to prevent the first resilient member 3A from coming away from the groove 12A.

The first resilient member 3A is then formed integrally with the lower surface of the diaphragm 2A using the method explained above.

The display unit 7A (shown only in FIG. 6) and the drive device fixed to the lower surface of the diaphragm 2A are housed within the recess 11A of the first case 1A (within a space 5A formed by the first case 1A and the diaphragm 2A).

Further, screw holes 21A, 21A, . . . passing through the upper surface of the diaphragm 2A are formed at four corners on the upper surface. Screw holes 13A, 13A, . . . that stepped screws 10A, 10A . . . are screwed into are formed on an upper end surface of the first case 1A corresponding to the screw holes 21A, 21A, . . . . The screw holes 13A, 13A, . . . are disposed on the outside of the groove 12A. The diaphragm 2A and the first case 1A are then fixed together by screwing the stepped screws 10A, 10A, . . . into each of the screw holes 21A, 21A, . . . and 13A, 13A, . . . via second resilient members 9A, 9A, . . . . As shown in FIG. 6, stepped sections 101A are formed at a boundary portion of the first case 1A and the diaphragm 2A. Portions of the stepped screws 10A screwed into screw holes 13A of the first case 1A have smaller diameters than the portions screwed into the screw holes 21A of the diaphragm 2A.

The second resilient members 9A are made, for example, of rubber etc. having cushioning properties and are sandwiched between head sections 102A of the stepped screws 10A and the diaphragm 2A. As a result, the second resilient members 9A prevent the stepped screws 10A from coming out while permitting vibration of the diaphragm 2A. Further, a fixed space S is formed at a boundary portion of the diaphragm 2A and the first case 1A by the stepped sections 101A of the stepped screws 10A. The first case 1A is therefore prevented from interfering with vibration of the diaphragm 2A.

With the display-side casing 100A formed in this way, the diaphragm 2A vibrates so as to function as a speaker due to being driven by the drive device.

Next, a description is given of a method of assembling the display-side casing 100A.

First, the first resilient member 3A is integrally formed at a prescribed position of the lower surface of the diaphragm 2A using well-known insert molding etc. Next, the drive device is fixed to the lower surface of the diaphragm 2A using double-sided tape.

On the other hand, the display unit 7A is housed in the recess 11A of the first case 1A. The protruding section 33A of the first resilient member 3A is press-fitted into the groove 12A of the first case 1A and the first case 1A is covered from above by the diaphragm 2A. The diaphragm 2A and the first case 1A are then fixed together by screwing the stepped screws 10A, 10A, . . . from the screw holes 21A, 21A, . . . of the diaphragm 2A to the screw holes 13A, 13A, . . . of the first case 1A via the second resilient members 9A, 9A, . . . .

The first resilient member 3A is then formed integrally at the lower surface of the diaphragm 2A facing towards the side of the first case 1A and is press-fitted into the groove 12A formed at the upper surface of the first case 1A facing towards the diaphragm 2A. The space between the diaphragm 2A and the first case 1A is then made waterproof by the first resilient member 3A press-fitted into the groove 12A. It is therefore possible to achieve waterproofing that does not depend on compression of the first case 1A and the diaphragm 2A and to implement a panel speaker. Further, the diaphragm 2A and the first resilient member 3A are integrally formed. It is therefore possible to reduce the number of components, simplify the structure, and achieve a degree of thinness.

The diaphragm 2A and the first case 1A are fixed using stepped screws 10A via the second resilient members 9A. It is therefore possible to implement a new design. In the second embodiment, the second case of the first embodiment is no longer necessary. It is therefore possible to further reduce the number of components, further simplify the structure, and achieve a further degree of thinness.

Third Embodiment

Figure 7:
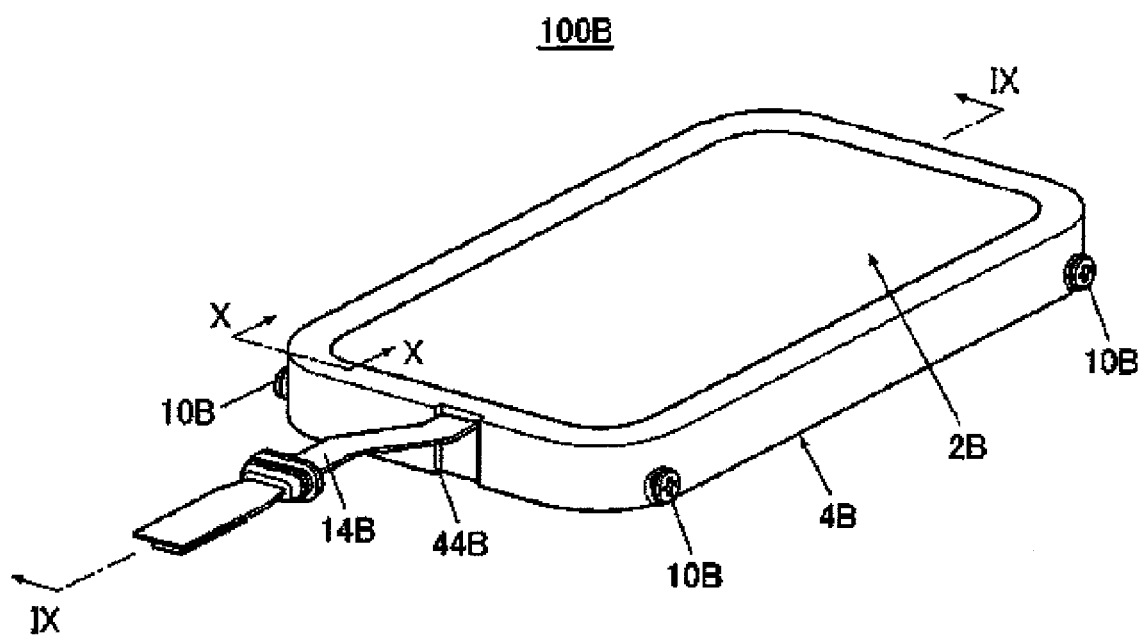
FIG. 7 is a perspective view of a display-side casing according to a third embodiment of the present invention.
Figure 8:
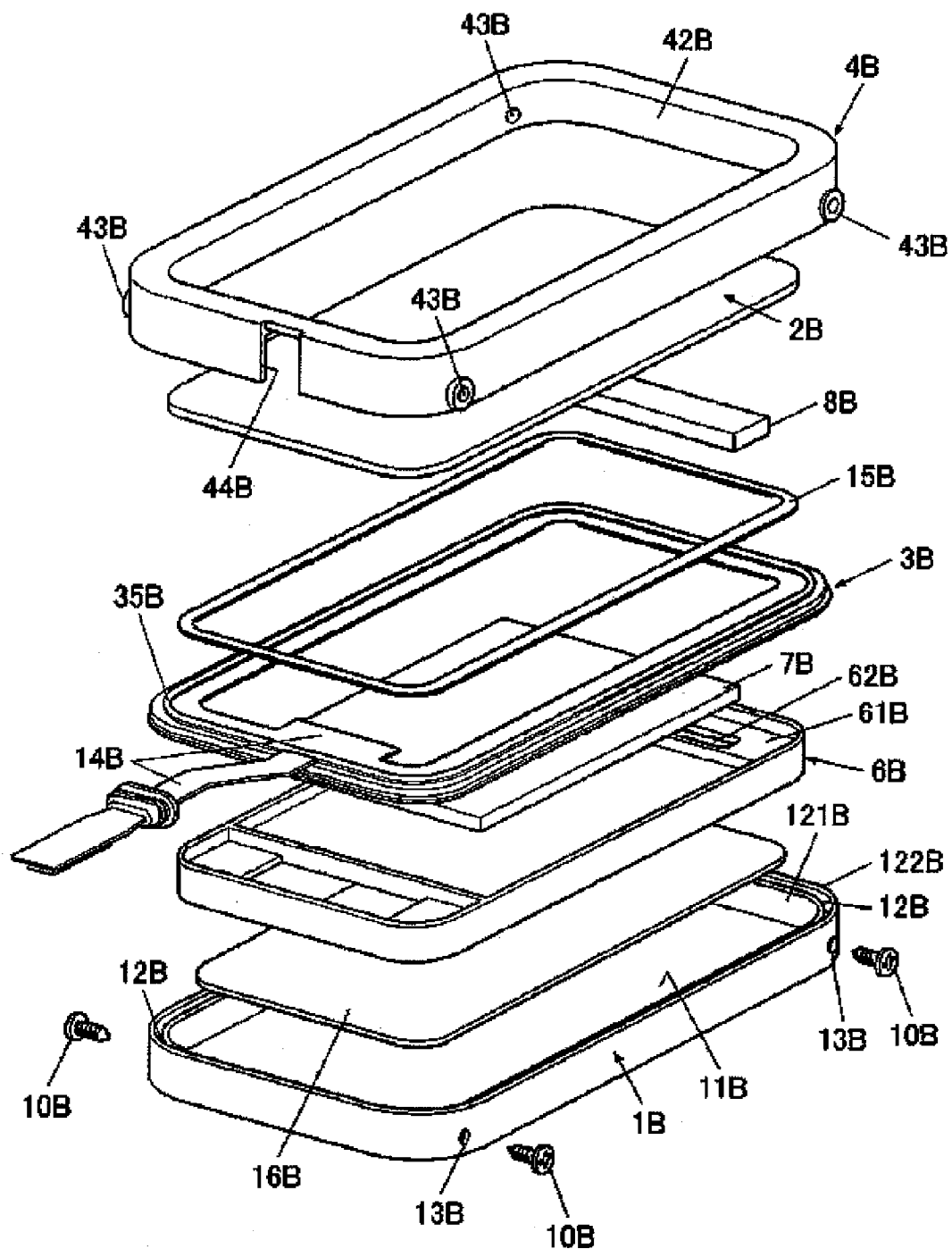
FIG. 8 is an exploded perspective view of the display-side casing according to the third embodiment of the present invention.
Figure 9:
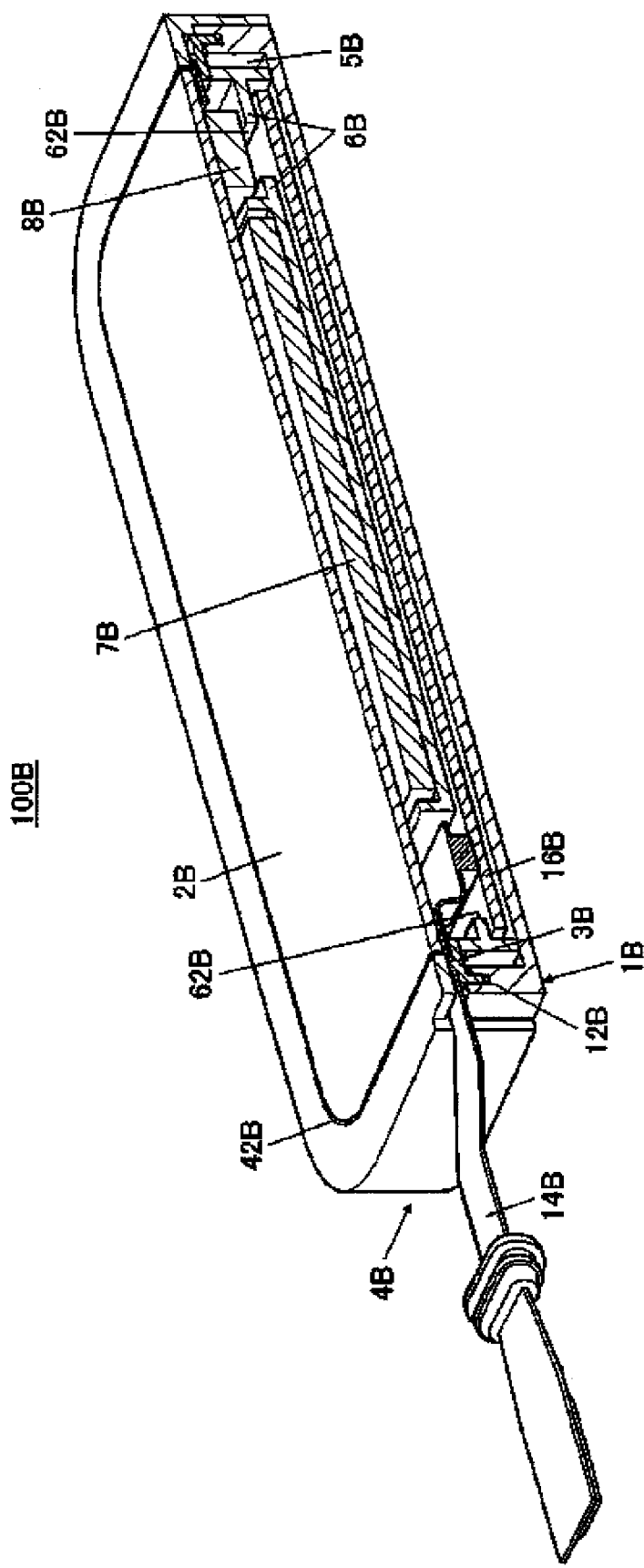
FIG. 9 is a cross-sectional view in the direction of an arrow of a cross-section cut along cutting plane line IX-IX of FIG. 7.
Figure 10:
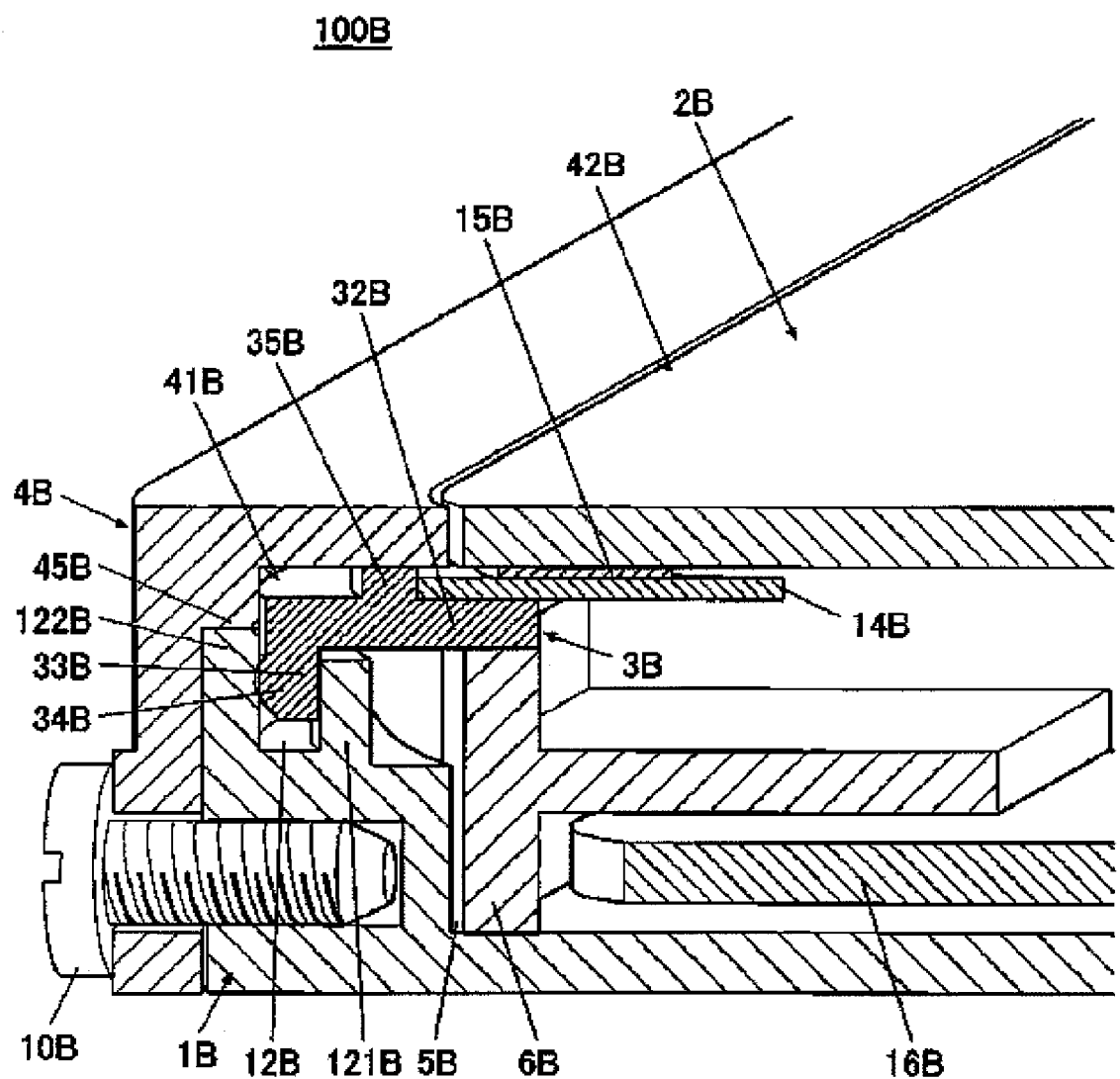
FIG. 10 is a cross-sectional view in the direction of an arrow of a cross-section cut along cutting plane line X-X of FIG. 7.

FIG. 7 is a perspective view of the display-side casing 100B. FIG. 8 is an exploded perspective view of the display-side casing 100B. FIG. 9 is a cross-sectional view in the direction of an arrow cut along cutting plane line IX-IX of FIG. 7. FIG. 10 is a cross-sectional view in the direction of an arrow cut along cutting plane line X-X of FIG. 7.

In the following description, "vertical direction" is explained taking FIG. 9 as a reference.

The third embodiment differs from the first embodiment in that a first resilient member 3B is fixed to the lower surface of a diaphragm 2B via a flexible wiring substrate 14B that is a film. The flexible wiring substrate 14B and the first resilient member 3B are integrally formed.

Specifically, the display-side casing 100B includes a first case 11B, the diaphragm 2B, and the first resilient member 3B. The diaphragm 2B is provided facing the first case 1B and doubles as a display panel. The first resilient member 3B is fixed to the lower surface of the diaphragm 2B facing the side of the first case 11B. The display-side casing 100B has an opening 42B, with the diaphragm 2B being disposed within the opening 42B. The display-side casing 100B includes a second case 4B and a center case 6B. The second case 4B covers the first case 1B from above. The center case 6B is housed within a space 5B formed between the first case 1B and the diaphragm 2B.

The first case 1B has a recess 11B, as with the first case 1 of the first embodiment. A groove 12B is formed at an upper end surface of the first case 1B in the shape of a rectangular frame. An upper end of an inner wall section 121B forming the groove 12B is slightly lower than the upper end of an outer wall section 122B. A first resilient member 3B is then disposed spanning the upper end of the inner wall section 121B and the upper end of the center case 6B.

The diaphragm 2B is in a substantially rectangular shape as with the diaphragm 2 of the first embodiment, with a drive device 8B fixed to a lower surface.

The substantially rectangular-shaped first resilient member 3B is fixed to the lower surface edge of the diaphragm 2B via the flexible wiring substrate 14B using double-sided tape 15B.

The first resilient member 3B is composed of, for example, rubber packing, and is in the shape of a rectangular frame. The first resilient member 3B includes an abutting section 35B, an extending section 32B, and a protruding section 33B. The abutting section 35B abuts with a recess 41B of the second case 4B. The extending section 32B extends from the abutting section 35B to the lower surface side of the diaphragm 2B and is disposed so as to span from the upper end of the center case 6B to the upper end of the inner wall section 121B forming the groove 12B. The protruding section 33B is provided at the outside tip of the extending section 32B and is press-fitted into the groove 12B of the first case 1B. A projection 34B press-fitting with the wall surface (outer wall section 122B) forming the groove 12B is formed at the protruding section 33B. It is therefore possible to prevent the first resilient member 3B from coming away from the groove 12B.

The first resilient member 3B is formed integrally with the flexible wiring substrate 14B. For example, thermal fusion using insert molding and coinjection molding using a material with self-adhering properties can be given as methods of integrally forming. However, there are no particular restrictions as long as resistance to peeling is provided and gaps are not present.

The flexible wiring substrate 14B is formed in the shape of a frame along an upper surface of the first resilient member 3B, as shown in FIG. 8 and FIG. 9. Part of the flexible wiring substrate 1413 passes through the abutting section 35B of the first resilient member 3B and extends towards the frame from within the frame to outside of the first resilient member 3B. The extending portion is lead out to the outside of the first case 11B and the second case 4B.

The second case 4B has the recess 41B hollowed out in an upward direction. The opening 42B is formed at the recess 41B and the diaphragm 2B is fitted to the opening 42B. Further, an engaging section 45B is formed at the recess 41B of the second case 4B and engages with the outer wall section 122B forming the groove 122B of the first case 3B. A cut-out withdrawing hole 44B for pulling out the flexible wiring substrate 14B to outside is formed at part of the second case 4B.

A substrate 16B and the center case 6B are housed from below in order within the recess 11B of the first case 113 (within the space 5B formed by the first case 11B and the diaphragm 2B). The substrate 16B has a liquid crystal display for a display unit 7B and a drive circuit such as the drive device 8B. The center case 6B has a recess 61B hollowed out downwards. The display unit 7B and the drive device 8B fixed to the lower surface of the diaphragm 2B are housed within the recess 61B of the center case 613. An opening 62B is formed at the center case 6B in such a manner that the substrate 16B disposed at the lower surface of the center case 6B is exposed. The flexible wiring substrate 14B is then connected to the substrate 16B exposed from the opening 62B (refer to FIG. 9).

Screw holes 43B, 43B, ... passing through the outer-side surface of the second case 4B are formed at the four corners on the outside surface. Further, screw holes 13B, 13B, ... that screws 10B, 10B, ... are screwed in are also formed at the outer-side surface of the first case 1B so as to correspond to the screw holes 43B, 43B, .... The first case 1B and the second case 4B are then fixed together by screwing the screws 10B, 10B, ... into the screw holes 43B, 43B ... and the screw holes 13B, 13B, ....

The display-side casing 100B formed in the above manner is then such that the diaphragm 2B is made to vibrate as a result of being driven by the drive device 8B so as to function as a speaker.

Next, a description is given of a method of assembling the display-side casing 100B.

First, the first resilient member 3B and the flexible wiring substrate 14B are integrally formed using well-known insert molding etc. Next, the first resilient member 3B formed integrally with the flexible wiring substrate 14B is fixed to the lower surface of the diaphragm 2B using double-sided tape 15B. The drive device 8B is then also fixed to the lower surface of the diaphragm 2B using double-sided tape.

On the other hand, the substrate 16B, the center case 6B, and the display unit 7B are housed within the recess 11B of the first case 1B. The protruding section 33B of the first resilient member 3B is then press-fitted into the groove 12B of the first case 1B. The second case 4B abuts with the abutting section 35B of the first resilient member 3B and the engaging section 45B engages with the outer wall section 122B. The first case 1B is then covered by the second case 4B by disposing the diaphragm 2B within the opening 42B of the second case 4B. At this time, part of the flexible wiring substrate 14B is lead out from the withdrawing hole 44B. Finally, the first case 1B and the second case 4B are fixed together by screwing the screws 10B, 10B, . . . into the screw holes 13B, 13B, . . . of the first case 1B from the screw holes 43B, 43B, . . . formed in the outer-side surface of the second case 4B.

The first resilient member 3B is formed integrally via the flexible wiring substrate 14B that is film at the lower surface of the diaphragm 2B facing towards the first case 1B. The first resilient member 3B is then press-fitted into the groove 12B formed at the upper surface facing the side of the diaphragm 2B of the first case 1B. It is therefore possible to waterproof the space between the diaphragm 2B and the first case 1B using the first resilient member 3B press-fitted into the groove 12B. It is also possible to achieve waterproofing that does not depend on compression of the first case 1B and the second case 4B and it is possible to implement a panel speaker. Further, the diaphragm 2B and the first resilient member 3B are integrally formed. It is therefore possible to reduce the number of components, simplify the structure, and achieve a degree of thinness.

Further, the first resilient member 3B is integrally formed at the lower surface of the diaphragm 2B via the flexible wiring substrate 14B. Printing on the back surface of the diaphragm 2B therefore becomes easier and it is possible to prevent the diaphragm 2B from becoming damaged when printing on the back surface.

In particular, the flexible wiring substrate 14B is used as a film. It is therefore not only possible to lead out the wiring to outside of the first case 1B, but it is also possible to curtail the structure for waterproofing independently from the wiring.

Further, the display-side casing 100B includes the second case 4B having an opening 42B and a center case 6B. The second case 4B covers the first case 1B. The center case 6B is housed within a space 5B formed between the first case 4B and the diaphragm 2B. The first resilient member 3B is fixed by the second case 4B and is disposed between the diaphragm 2B and the center case 6B. The display-side casing 100B is therefore capable of ensuring protection from abnormal loads from the surface of the diaphragm 2B and is capable of ensuring mobility as a result of the diaphragm not being constrained, using the first resilient member 3B and the center case 6B.

Fourth Embodiment

Figure 11:
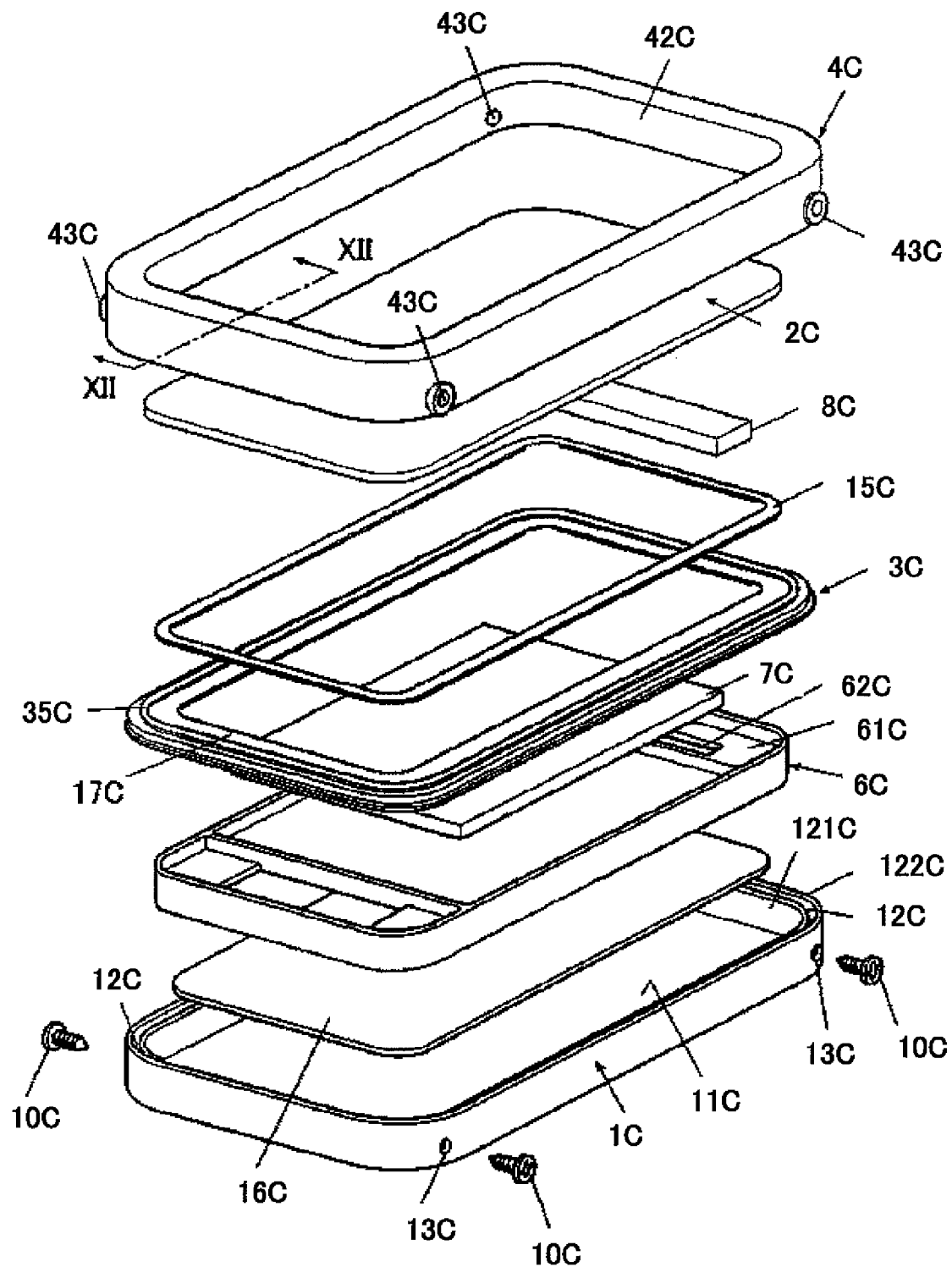
FIG. 11 is an exploded perspective view of a display-side casing according to a fourth embodiment of the present invention.
Figure 12:
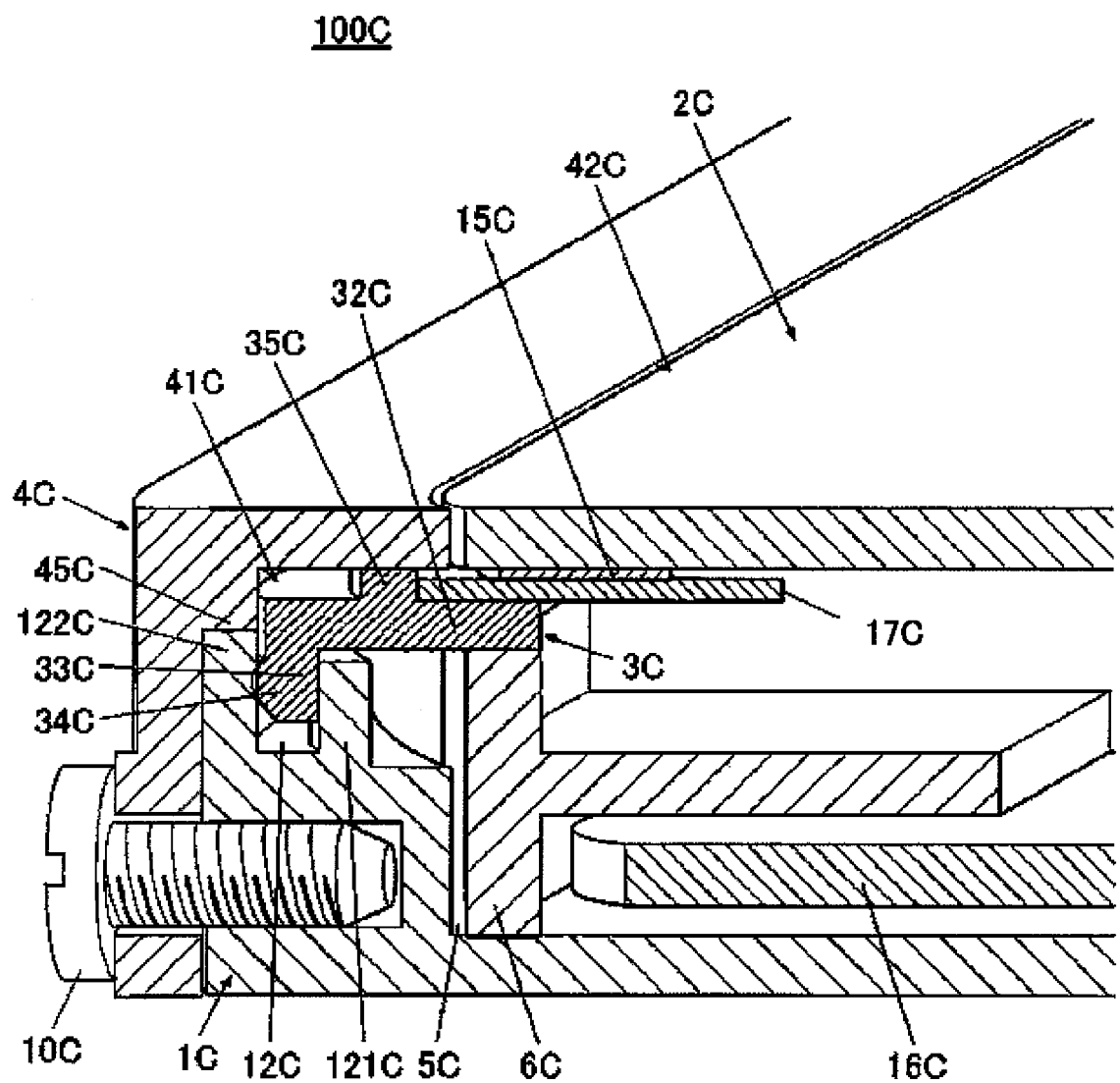
FIG. 12 is a cross-sectional view in the direction of an arrow cut along cutting plane line XII-XII with the display-side casing of FIG. 11 assembled.

FIG. 11 is an exploded perspective view of the display-side casing 100C. FIG. 12 is a cross-sectional view in the direction of an arrow cut along a cutting plane line XII-XII when the display-side casing 100C in FIG. 11 is assembled.

In the following description, "vertical direction" is explained taking FIG. 12 as a reference.

In the fourth embodiment, as in the third embodiment, the flexible wiring substrate 14B is taken to be a simple film 17C and the case is given where the film 17C and a first resilient member 3C are integrally formed. Other aspects of the configuration are the same as for the third embodiment. The character C is therefore given to portions of the configuration that are the same and the portions are not explained.

The film 17C is positioned on the upper surface of an extending section 32C of the first resilient member 3C, further to the inside than an abutting section 35C. The film 17C and the first resilient member 3C are integrally formed using a well-known method. The upper surface of the film 17C and the lower surface of the diaphragm 2C are fixed via double-sided tape 15C.

The method of assembling the display-side casing 100C is basically the same as for the third embodiment and is not explained.

Fifth Embodiment

Figure 13:
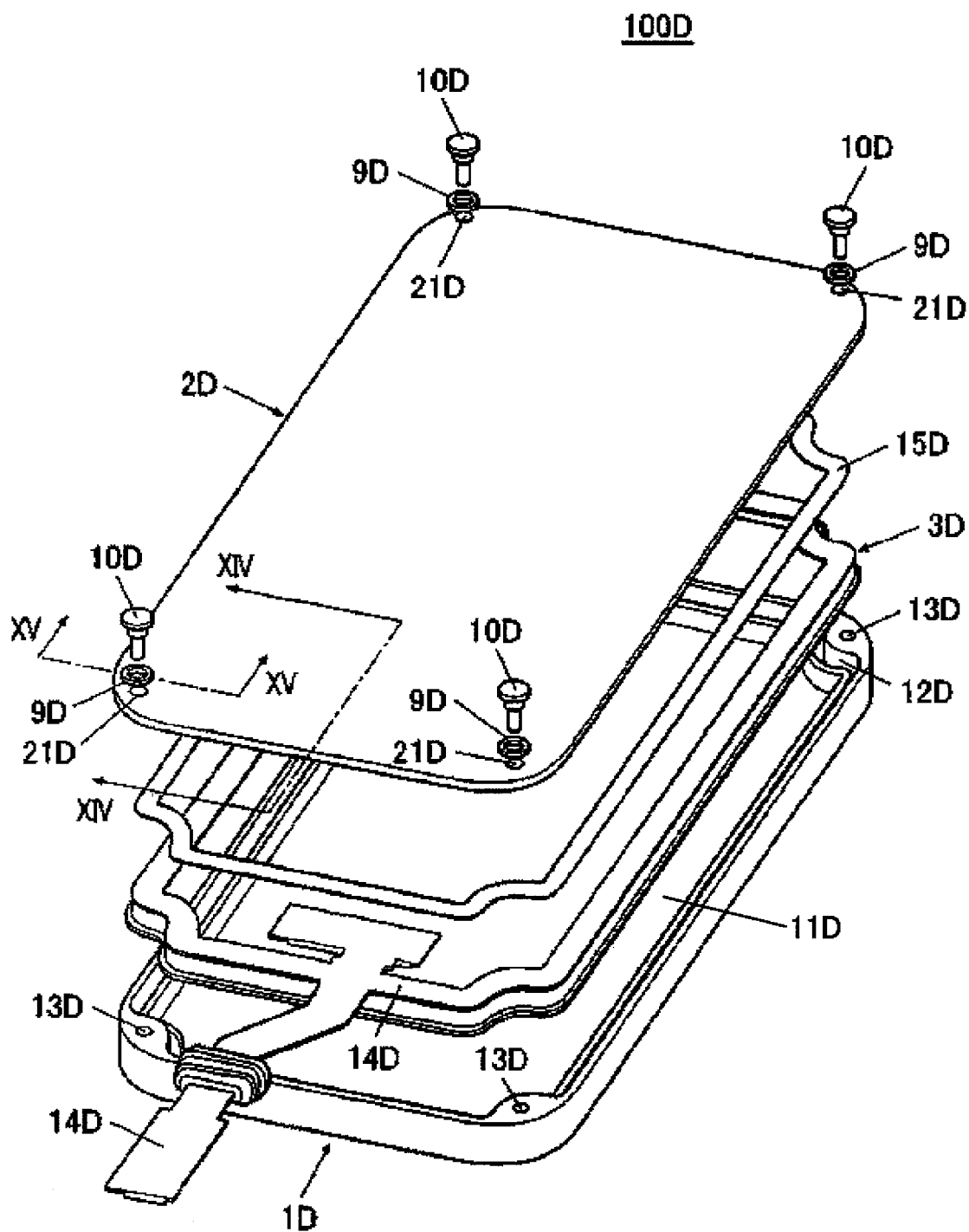
FIG. 13 is an exploded perspective view of a display-side casing according to a fifth embodiment of the present invention.
Figure 14:
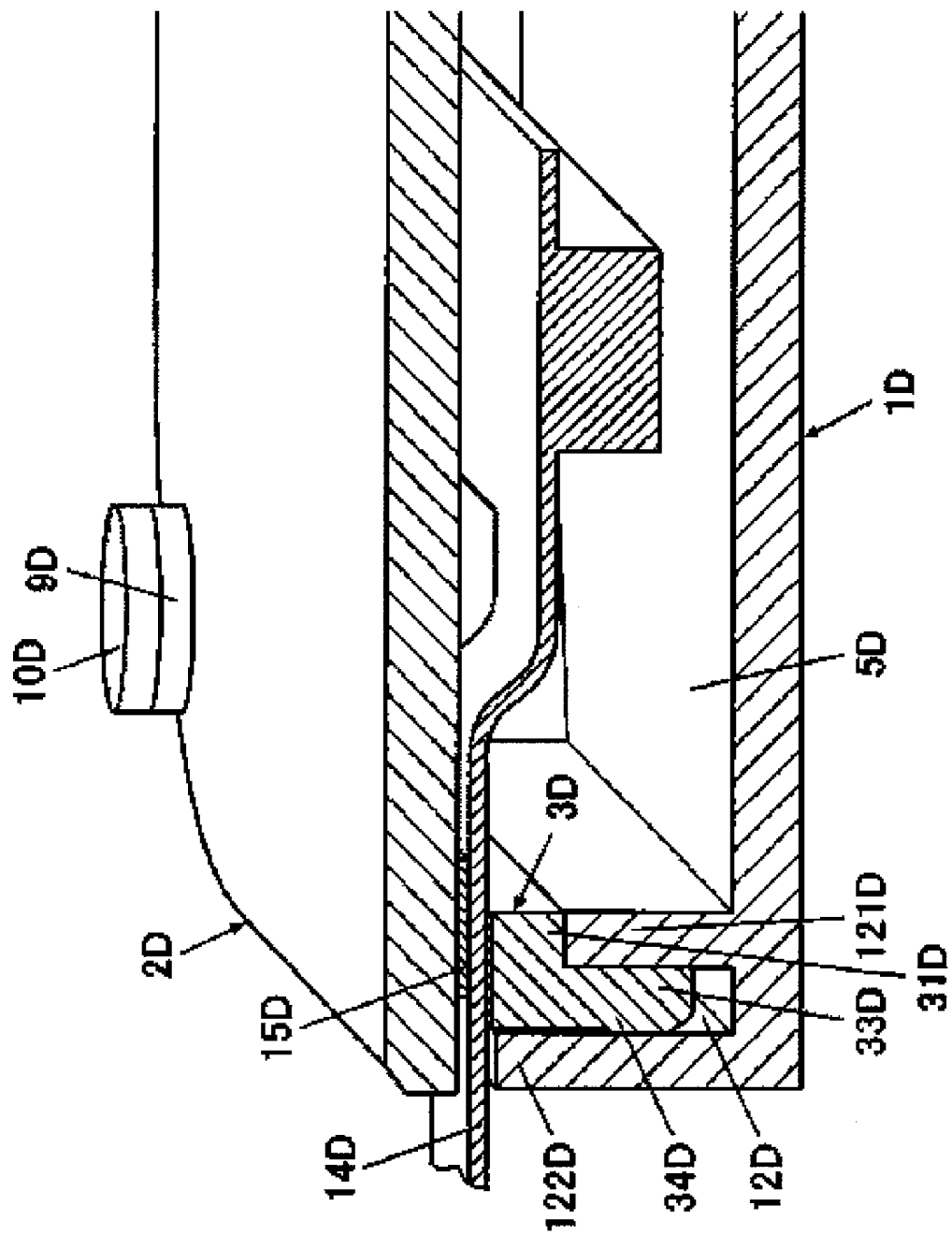
FIG. 14 is a cross-sectional view in the direction of an arrow cut along cutting plane line XIV-XIV with the display-side casing of FIG. 13 assembled.
Figure 15:
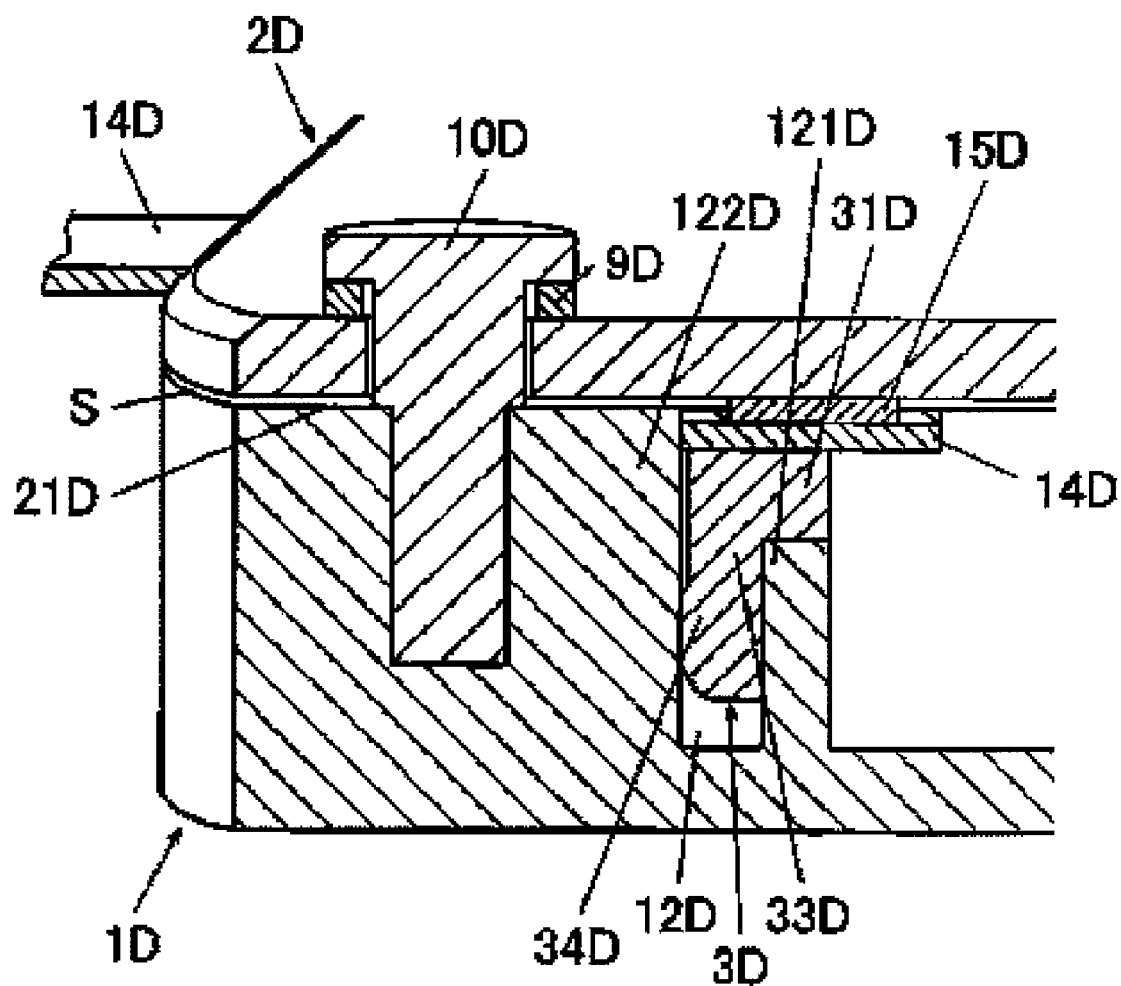
FIG. 15 is a cross-sectional view in the direction of an arrow cut along cutting plane line XV-XV of FIG. 13.

FIG. 13 is an exploded perspective view of the display-side casing 100D. FIG. 14 is a cross-sectional view in a direction of an arrow cut along a cutting plane line XIV-XIV with the display-side casing 100D in FIG. 13 assembled. FIG. 15 is a cross-sectional view in a direction of an arrow cut along a cutting plane line XV-XV of FIG. 13.

In the following description, "vertical direction" is explained taking FIG. 14 as a reference.

In the fifth embodiment, as in the third embodiment, a first resilient member 3D is fixed to the lower surface of a diaphragm 2D via the flexible wiring substrate 14D that is a film. The flexible wiring substrate 14D and the first resilient member 3D are formed integrally. A second case is not provided, as in the second embodiment, and the diaphragm 2D and a first case 1D are fixed together directly.

Specifically, the display-side casing 100D includes the first case 1D, the diaphragm 2D, and the first resilient member 3D. The diaphragm 2D is provided facing the first case 1D and doubles as a display panel. The first resilient member 3D is fixed to the lower surface of the diaphragm 2D facing the side of the first case 1D via the flexible wiring substrate 14D that is film.

The first case 1D is the same as the first case 1A of the second embodiment and has a recess 11D. A groove 12D is formed in the shape of a rectangular frame on the upper end surface of the first case 1D. Further, an upper end of an inner wall section 121D forming the groove 12D is slightly lower than the upper end of the outer wall section 122D. The first resilient member 3D is then disposed on the upper end of the inner wall section 121D.

The diaphragm 2D is the same as the diaphragm 2A of the second embodiment and is a substantially rectangular-shaped plate of substantially the same size as the upper surface of the first case 1D and has a drive device fixed to a lower surface.

Further, a substantially rectangular frame-shaped first resilient member 3D is fixed using double-sided tape 15D to a lower surface edge of the diaphragm 2D via the flexible wiring substrate 14D.

The first resilient member 3D is the same as the first resilient member 3A of the second embodiment and includes a mounting section 31D and a protruding section 33D. A projection 34D is formed at the protruding section 33D.

The flexible wiring substrate 14D is then formed integrally using insert molding etc. at an upper surface of the first resilient member 3D.

As shown in FIG. 13 to FIG. 15, the flexible wiring substrate 14D is formed in the shape of a frame along an upper surface of the first resilient member 3D. Part of the flexible wiring substrate 14D extends from inside the frame of the first resilient member 3D to outside of the frame. The extending portion is then lead-out to outside of the first case 1D.

A display unit and a drive device fixed to the lower surface of the diaphragm 2D are housed within the recess 11D (within a space 5D formed by the first case 1D and the diaphragm 2D) of the first case 1D. A substrate having a liquid crystal display for the display unit and a drive circuit such as a drive device is also housed, as in the third embodiment.

Further, four screw holes 21D, 21D, . . . are formed at the upper surface of the diaphragm 2D as in the second embodiment, and four screw holes 13D, 13D, . . . are also formed at an upper end surface of the first case 1D. The diaphragm 2D and the first case 1D are then fixed together by screwing the stepped screws 10D, 10D, . . . into the screw holes 21D, 21D, . . . and the screw holes 13D, 13D, . . . via second resilient members 9D, 9D, . . . . The stepped screws 10D and the second resilient members 9D are the same as the stepped screws 10A and the second resilient members 9A of the second embodiment.

The display-side casing 100D is such that the diaphragm 2D is made to vibrate as a result of being driven by the drive device so as to function as a speaker.

Next, a description is given of a method of assembling the display-side casing 100D.

First, the first resilient member 3D and the flexible wiring substrate 14D are integrally formed using well-known insert molding etc. Next, the first resilient member 3D integrally formed with the flexible wiring substrate 14D is fixed to the lower surface of the diaphragm 2D using the double-sided tape 15D. The drive device is fixed to the lower surface of the diaphragm 2D using double-sided tape.

On the other hand, a substrate and a display unit are housed in the recess 11D of the first case 1D. The protruding section 33D of the first resilient member 3D is press-fitted into the groove 12D of the first case 1D. The first case 1D and the center case are then covered from above by the diaphragm 2D. The diaphragm 2D and the first case 1D are fixed together by screwing the stepped screws 10D, 10D, . . . into the screw holes 13D, 13D, . . . of the first case 1D from the screw holes 21D, 21D, . . . of the diaphragm 2D via the second resilient members 9D, 9D, . . . .

The first resilient member 3D is integrally formed at the lower surface of the diaphragm 2D facing the side of the first case 1D via the flexible wiring substrate 14D that is a film. The first resilient member 3D is then press-fitted into the groove 12D formed on the upper surface of the first case 1D facing towards the side of the diaphragm 2D. It is therefore possible to waterproof the space between the diaphragm 2D and the first case 1D using the first resilient member 3D press-fitted into the groove 12D. It is also possible to achieve waterproofing that does not depend on compression of the first case 1D and the diaphragm 2D and to implement a panel speaker. Further, the diaphragm 2D and the first resilient member 3D are integrally formed. It is therefore possible to reduce the number of components, simplify the structure, and achieve a degree of thinness.

Further, the first resilient member 3D is integrally formed at a lower surface of the diaphragm 2D via the flexible wiring substrate 14D. Printing on the back surface of the diaphragm 2D is therefore more straightforward and it is possible to prevent the diaphragm 2D from becoming damaged during printing on the back surface.

In particular, the flexible wiring substrate 14D is used as a film. It is therefore possible not only to lead out the wiring to outside of the first case 1D, but also to curtail the structure for waterproofing independent from the wiring.

Further, the diaphragm 2D and the first case 1D are fixed using the stepped screws 10D via the second resilient members 9D. It is therefore possible to achieve a novel design and the second case is not necessary as in the third embodiment. It is therefore possible to reduce the number of components, simplify the structure, and achieve thinness.

Various embodiments and changes may be made thereunto without departing from the broad spirit and scope of the invention. The above-explained embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-274915 filed on Oct. 23, 2007 and including specification, claims, drawings and summary. The disclosure of the above Japanese Patent Application is incorporated herein by reference in its entirety.

What is claimed is:

1. A waterproof structure comprising:
a first case,
a diaphragm doubling as a display panel provided corresponding to the first case and configured to emit sound by vibrating,
a first resilient member integrally formed at a surface of the diaphragm facing the first case, and
a driving device that transmits a vibration to the diaphragm and is housed within a space formed by the first case and the diaphragm,
wherein the first resilient member is press-fitted into a groove formed in a surface of the first case facing the diaphragm side.

2. The waterproof structure according to claim 1, wherein the diaphragm and the first case are fixed using stepped screws via a second resilient member.

3. An electronic equipment equipped with the waterproof structure according to claim 1.

4. The waterproof structure according to claim 1, wherein the diaphragm, the first resilient member, and the first case form a sealed container enclosing the driving device.

5. A waterproof structure comprising:
a first case,
a diaphragm doubling as a display panel provided corresponding to the first case and configured to emit sound by vibrating,
a first resilient member integrally formed at a surface of the diaphragm facing the first case,
a second case having an opening within where the diaphragm is disposed, covering the first case, and
a center case housed within a space formed between the first case and the diaphragm,
wherein the first resilient member is press-fitted into a groove formed in a surface of the first case facing the diaphragm side,
the diaphragm is disposed within the opening of the second case, and
the first resilient member is fixed by the second case and is disposed between the diaphragm and the center case.

6. A waterproof structure comprising:
a first case,
a diaphragm doubling as a display panel provided corresponding to the first case and configured to emit sound by vibrating,
a first resilient member formed integrally with a film at a surface of the diaphragm facing the first case,
a second case having an opening within where the diaphragm is disposed, covering the first case, and
a center case housed within a space formed between the first case and the diaphragm,
wherein the first resilient member is press-fitted into a groove formed at a surface of the first case facing the diaphragm,
the diaphragm is disposed within the opening of the second case, and
the first resilient member is fixed by the second case and is disposed between the diaphragm and the center case.

7. A waterproof structure comprising:
a first case,
a diaphragm doubling as a display panel provided corresponding to the first case and configured to emit sound by vibrating, and
a first resilient member formed integrally with a film at a surface of the diaphragm facing the first case, wherein the first resilient member is press-fitted into a groove formed at a surface of the first case facing the diaphragm.

8. The waterproof structure according to claim 7, wherein the film is a flexible wiring substrate.

9. The waterproof structure according to claim 7, wherein the diaphragm and the first case are fixed using stepped screws via a second resilient member.

10. An electronic equipment equipped with the waterproof structure according to claim 7.

11. The waterproof structure according to claim 7, wherein the diaphragm, the first resilient member, and the first case form a sealed container.

* * * * *